United States Patent [19]

Willett

[11] Patent Number: 4,499,472
[45] Date of Patent: Feb. 12, 1985

[54] SEQUENTIALLY STEERED RECEIVER WITH TIMED RECYCLE CALIBRATION

[76] Inventor: Richard L. Willett, 10716 Citrus Dr., Moorpark, Calif. 93021

[21] Appl. No.: 550,832

[22] Filed: Nov. 14, 1983

[51] Int. Cl.³ .......................... H01Q 3/02; H01Q 3/12
[52] U.S. Cl. .................................... 343/374; 343/375; 343/17.7
[58] Field of Search .................... 343/17.7, 368, 371, 343/372, 374, 375

[56] References Cited

U.S. PATENT DOCUMENTS 4,320,400  3/1982  Chasek ........................... 343/444

Primary Examiner—Theodore M. Blum

[57] ABSTRACT

An omnidirectional receiver includes directional arrays for input signal directional arrays for input signal detection. The array signals are compared to determine which array has developed the greatest signal and its direction. The receiver is then stirred or switched to the identified directional array. After a delay to allow for steering, the input signal from the selected array is phase detected. Then after a second delay one of the phase detected signals is divided and replicated to determine the internal phase error and for phase comparison.

6 Claims, 6 Drawing Figures

SEQUENTIALLY STEERED RECEIVER WITH TIMED RECYCLE CALIBRATION

This invention relates to an omnidirectional receiver which uses the same input signal through coordinated delay periods to sequentially steer and calibrate the system.

Applicant's copending applications Ser. Nos. 550,831 and 551,615, which are assigned to the common assignee are all related applications.

BACKGROUND OF THE INVENTION

Monopulse interferometers are used to provide azimuth and elevation measurements of an incoming signal relative to the bore sight of the antenna. As the final angular measurement depends upon a relative phase measurement, the system for processing the incoming signal must be precisely aligned so that no phase error is introduced. The need for eliminating phase error is increased where delay lines are introduced into the system such as in a wide band steerable receiver. As the delay lines inherently carry phase change into the system, it is critical to the operation of the interferometer that any such inherent change, modifying the actual phase measurement, be calibrated so a corrected accurate phase measurement uncontaminated by the delay line phase shift or any other phase error, may be produced.

SUMMARY OF THE INVENTION

The preferred embodiment may be explained by a series of four (4) steps. In step 1, the wide band intercept receiver first determines the frequency of each incoming signal and switches a steerable interferometer to the incoming frequency. After the steerable interferometer receivers have been switched to the signal frequency, and in step 2, the signal amplitudes from each directional antenna array are measured to determine and select the array most closely pointed in the direction of the signal source. In the case of four arrays, the quadrant direction is determined by amplitude comparison. In step 3, the signal is then measured to determine its phase relationship to the bore sight of the receiving antenna array in the selected quadrant and to determine azimuth and elevation. Finally, in step 4, the phase measuring system is calibrated to determine the phase shift introduced into the system by the receiving subsystem for the selected quadrant and to correct the phase measurement for internal phase error.

According to the principles of the invention, an incoming signal such as a pulse, of a plurality of cycles comprised by the received signal, is simultaneously stored in one or more delays and used in successive measurements. During the first delay, the steerable receivers are switched to the incoming signal frequency, and the same incoming stored signal which has been stored is then used in successive processing steps to determine the quadrant and phase of the incoming signal and ultimately to calibrate the receiving subsystem. In the preferred embodiment, an omnidirection wide band capability is accomplished through the combination of four quadrant antenna arrays. The incoming frequency is simultaneously stored within delay lines and used to determine, within that delay the incoming frequency. Switchable local oscillators are used to select the proper 100 MHz. portion of the 500 MHz. wide band width and switchable filters are used to select the appropriate 25 MHz. channel within the selected 100 MHz. band. In the preferred embodiment, one of five fixed local oscillators and one of five fixed filters are selected upon command from assignment logic once the incoming frequency has been determined.

In the preferred embodiment, simultaneously with the reception of the signal in the intercept receiver, that signal is stored by a first delay T1 and second delay T2. At the end of T1, the signal quadrant is determined by amplitude comparison. As the delays effectively store the signal for later use, one or more receiver sets may be used with sequential delay lines, or any other suitable storage technique, so the incoming signal received from each antenna array may be compared one to the other in time sequence or simultaneously. For simultaneous comparison, separate receivers will be required for each of the antenna arrays. For purposes of explanation, four separate receivers are used, one for each of the four quadrant antenna arrays, where simultaneous amplitude comparison is desired. In the preferred embodiment, these four receivers are subsequently used for phase measurement after a delay suitable to complete the amplitude comparison. The four signals used for amplitude comparison are each delayed and enter the pretuned steerable receiver at the end of the delay initial period after step 1 when the incoming signal frequency has been determined and the receivers have been tuned to the narrow band frequency channel. In step 2, an amplitude comparison then takes place which indicates which array developes the largest amplitude from the incoming signal and the quadrant most closely directed to the signal source.

Upon quadrant determination, the system is switched to process the signal from that identified array and is now ready to detect the phase of the incoming signal in step 3.

During the period of phase measurement, step 3, the signals from the selected quadrant array are measured by collecting multiple intra-pulse samples. These samples are averaged to obtain best possible accuracy for each pulse, with less critical parameters quantized using one measurement per pulse. As is well-known, an omnidirectional array comprises a plurality of antenna arrays with each array having a plurality of subelements and provides the signals from each antenna element over a respective quadrant IF inputs to the respective receivers.

At the end of delay T2, the incoming signal appears at the input to the phase detector. The signal is reproduced or replicated by splitting it into a number of signals typically equal to the number of receiving IF inputs connecting the selected quadrant array elements to the phase detector. The replicated signal may also be produced from the output of a separate delay which provides its signal to the phase detector after the initial phase detection of step 3 is completed. That replicated signal is introduced to the input of each of the IF inputs and each of the IF inputs are provided with signals exactly matched in a predetermined phase relationship, such as zero phase difference. These signals then in step 4 are processed through the same receiving system, including the same delay lines, as used to process the signal used in the phase measurement process of step 3. The output phase of each subchannel is compared with the phase of the introduced or replicated signal to determine the phase difference produced by each IF input. This phase difference is then used as an IF input error measurement and used with the previously obtained phase measurement from each of the receiver IF inputs to determine the error free phase relation of the incoming signal developed in the selected quadrant array.

DESCRIPTION OF THE PREFERRED EMBODIMENT

The invention is described with reference to FIGS. 1, 2 and 3. Monopulse techniques to detect the angle of incoming signals with regard to azimuth and elevation by phase detection are well-known and do not form part of this invention. Further, components are shown in functional diagrams, where the construction of such elements are well-known.

Figure 1:
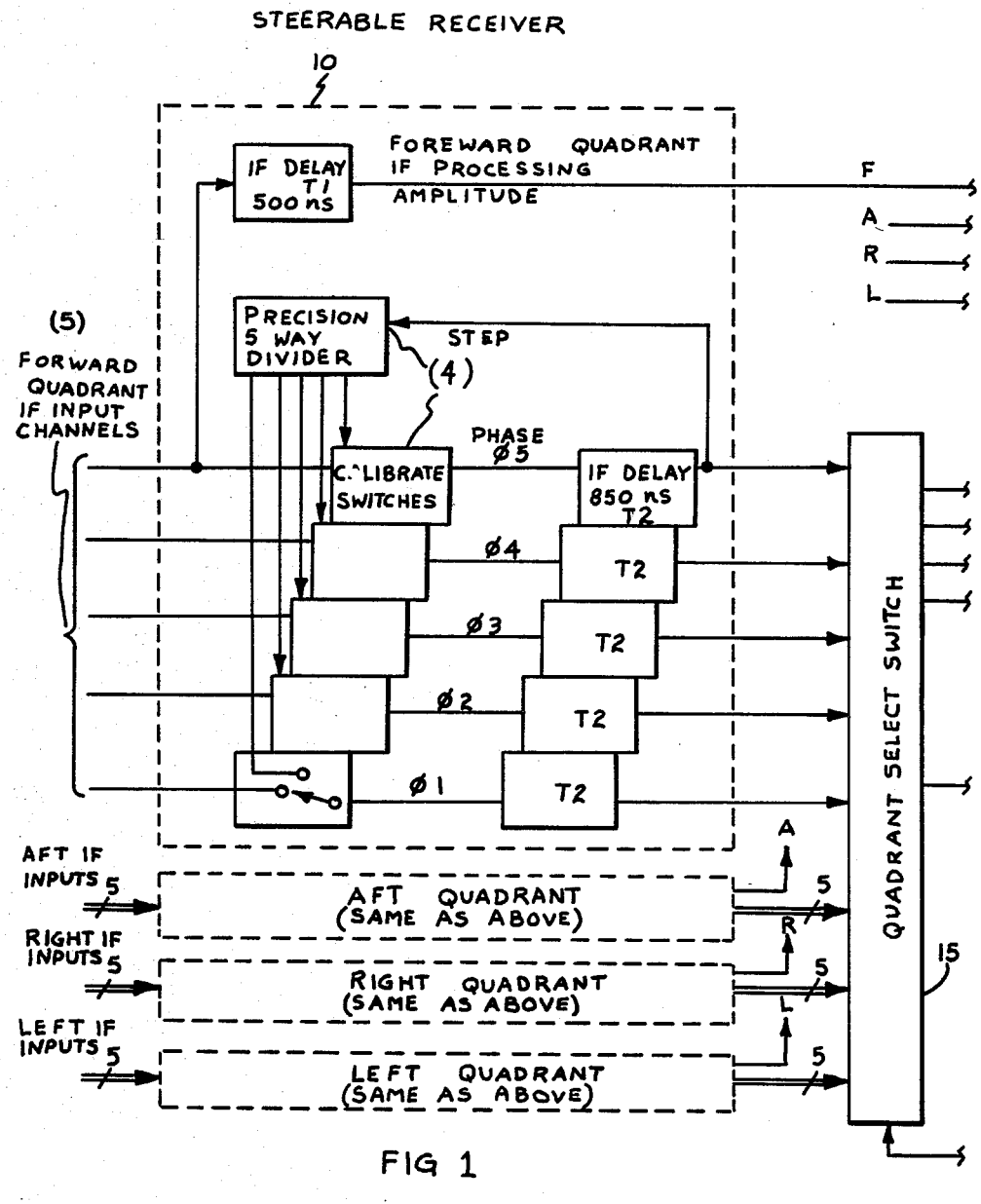
FIGS. 1 and 1a shows a first embodiment of the overall system in a schematic form and the manner that signals from the separate arrays may be simultaneously processed through the separate delay lines for sequential steering of the array in the signal direction and phase detection and calibration.
Figure 1A:
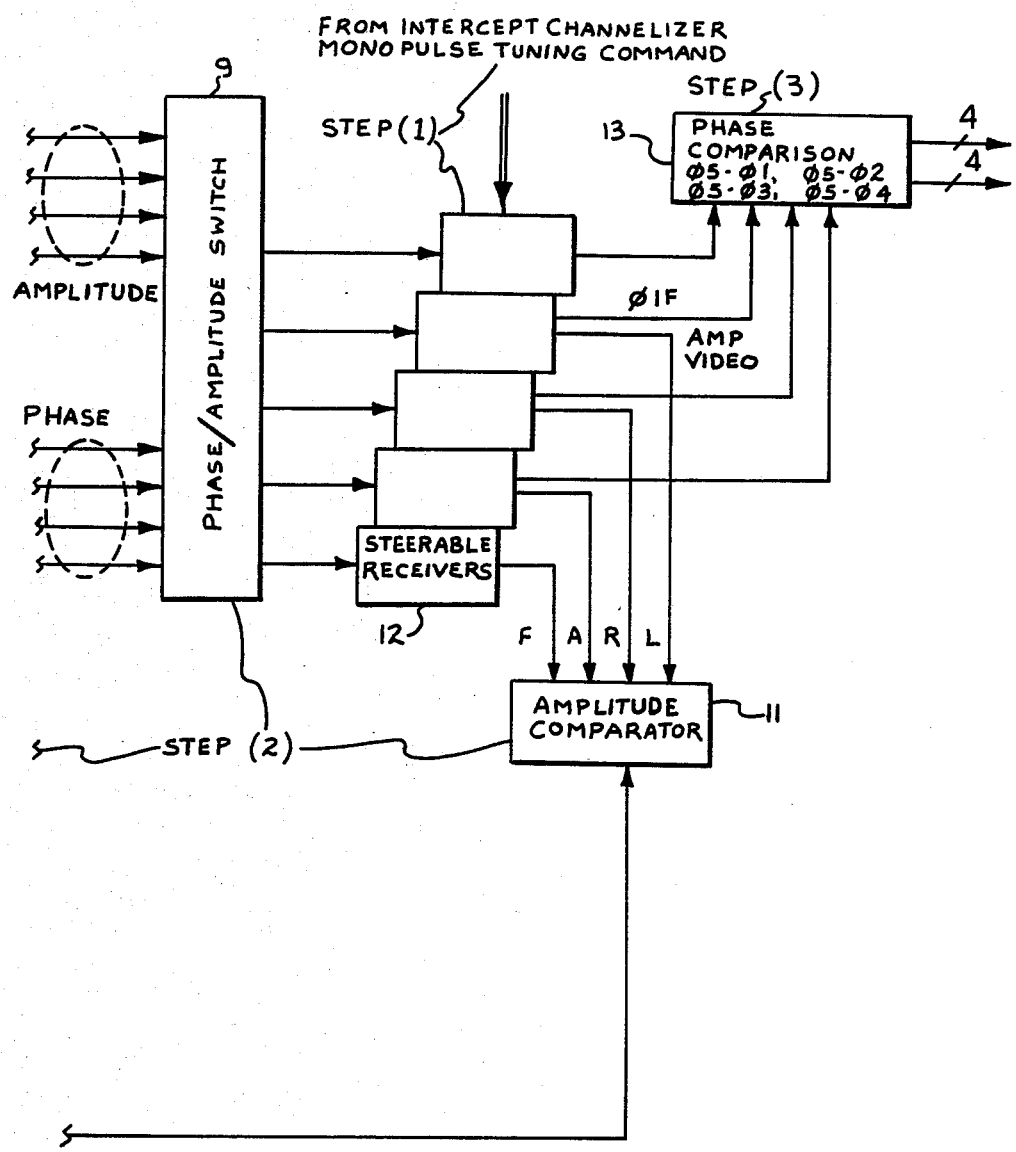

Referring to FIG. 1 the receiving system is shown as having, in the preferred embodiment, four antenna arrays, forward (F), aft (A), right (R) and left (L). Each of the four antenna arrays are arranged in quadrature and thereby produce an omnidirectional array over 360°. Consistent with known monopulse techniques, and in the preferred embodiment, each of the antenna arrays' IF processing system is as shown in the dashed outline box entitled "Forward Quadrant IF Processing" and provides five separate signals over five IF inputs from five elements of the interferometer, as shown in detail for the Forward Quadrant. Within the preferred embodiment, during step 1 and during the initial delay T1 (500 nsec), the incoming signal is used to determine and tune the receivers 12 to the narrow band signal frequency. The channel select logic subsystem for incoming narrow band frequency determination and switching does not form part of this invention. Step 1 refers to the elements involved in frequency selection as shown in FIGS. 1 and 2.

After the initial delay T1 and in step 2, the array signals appear at the output of each respective delay T1 for each IF quadrant processing system and at the input to the phase amplitude switch 9 and are provided through the steerable receivers 12 to an amplitude comparator 11. An IF delay of T1 (500 nsec) is shown connected between one of the array Forward Quadrant IF inputs and the phase amplitude switch 9. A similar delay would be included in each of the other quadrant IF processing systems. The amplitude comparator 11 compares the separate amplitudes received from each of the four IF's over channels F, A, R and L by any suitable known comparison technique and provides a signal to the quadrature select switch 15. The particular technique used to compare the relative amplitudes and to identify the greatest amplitude would be any well-known technique. The quadrature select switch 15 switches the IF quadrant and its array developing the highest amplitude signal to the phase detection logic 13 through its respective array IF quadrant IF processing system, either F, A, R or L and its respective delays T2. In the preferred embodiments, T2 is 850 nsec.

Figure 3A:
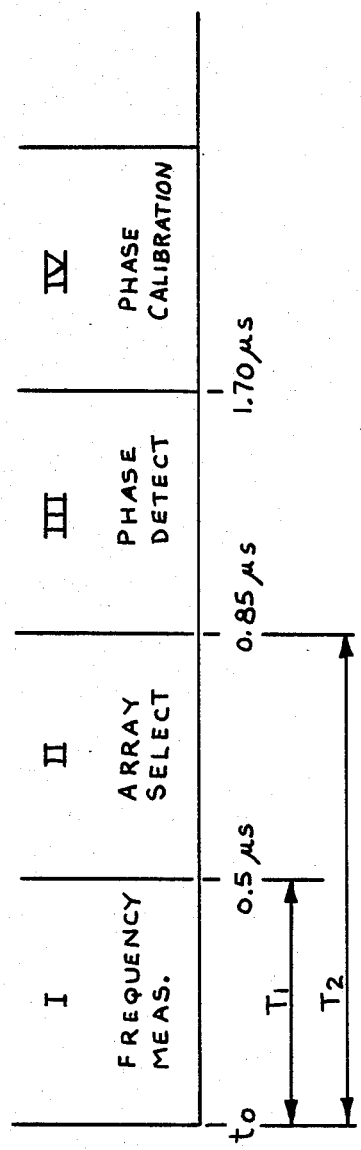
FIGS. 3a and 3b are time diagrams showing the phase measurement and calibration process in sequence for the embodiments of FIG. 1 and FIG. 2.

As stated above and as shown in FIG. 1 and FIG. 3, the frequency selection and tuning process takes place within the initial delay period T1, during the first 0.5 nsec after the signal is received. During a longer and overlapping delay period of T2 (0.85 nsec), the quadrature selector switch 15 responsive to amplitude comparator 11 connects the array antenna developing the highest amplitude signal through its respective quadrant IF processing system, to the phase detector 13. During a successive period extending from the end of T2 and as shown by period III in FIG. 3a, phase detection takes place. It should be understood that each array channel could include one or more stages of amplification.

Figure 2:
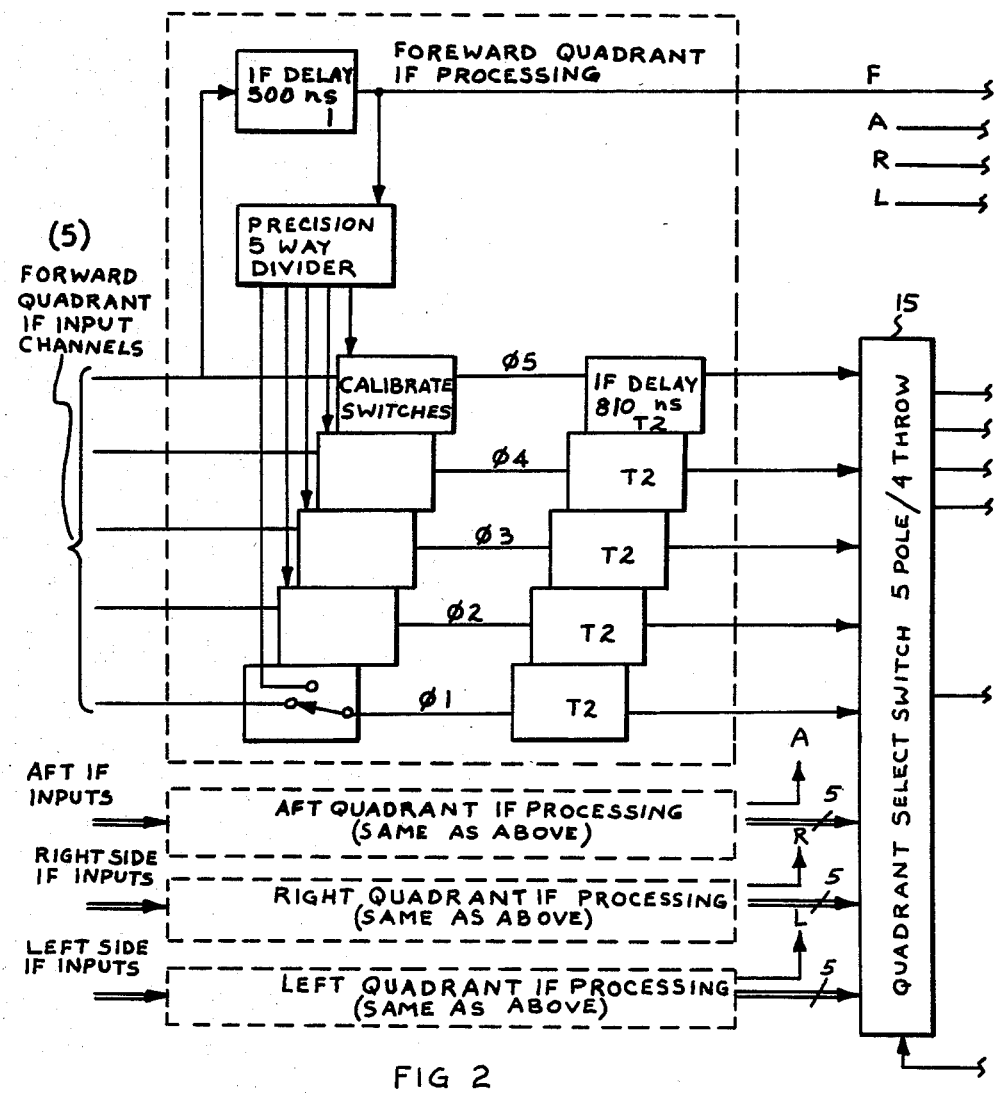
FIGS. 2 and 2a shows a second embodiment of the system of FIG. 1.
Figure 2A:
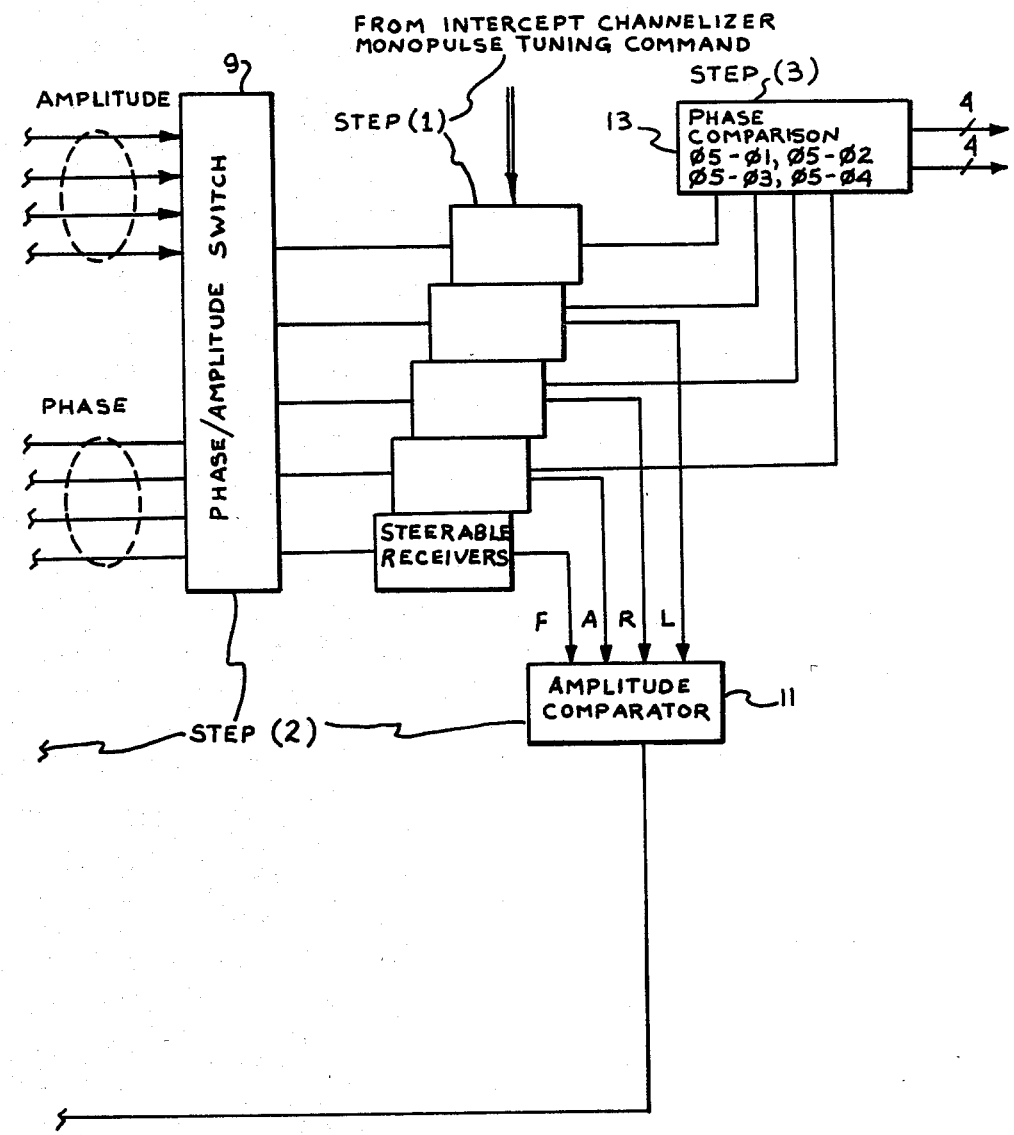

The input signal appearing at the output of the respective delay T2 in FIG. 1 or T1 in FIG. 2 is reproduced or replicated by the precision 5 way divider so signals of identical phase with a known zero phase difference are provided back into the respective IF for the purpose of calibration of each IF input. The output of the phase detector during the calibration mode would then be the phase difference introduced by the IF inputs.

Figure 3B:
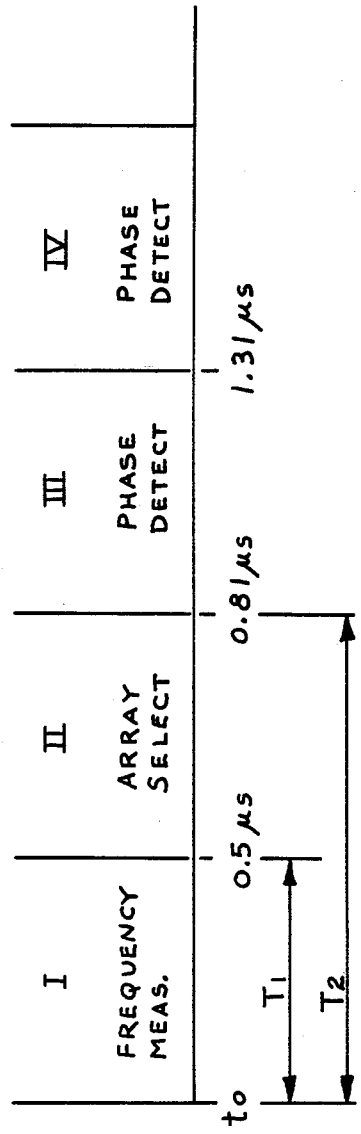

To reorient the reader, the manner of using the receiver shown herein is summarized again as follows. The signal is received on each of the arrays making the omnidirectional antenna, in this case the forward, aft, right and left arrays (F, A, R, L). Each of the arrays in the preferred embodiment has five IF inputs as shown in box 10 in FIGS. 1 and 2 for the Forward Quadrant. For amplitude steering, related signals from each of the arrays may be processed through the phase amplitude switch 9 and the amplitude comparator 11 to determine the source of the signal and then the quadrant selector switch 15 may be used to connect the phase comparator 13 through the steerable receivers 12, the phase amplitude switch 9 to the array developing the greatest amplitude signal. For example, if it was found that the Forward Quadrant received a stronger signal, then the quadrant select signal 15, responsive to an amplitude comparison would switch to the five IF inputs of the Forward Quadrant to the phase detector 13. These phase signals would then be connected through steerable receivers 12 to the phase detector 13. As shown in FIGS. 3a and 3b, and assuming the signal is received at T0, during time interval T1, step 1 takes place and the steerable receivers 12 are switched to receive the signal at its incoming frequency. The signal is also delayed by delay for each of the antenna arrays as shown in FIGS. 1 and 2. In the preferred embodiments, delay T1 is 500 nsec. At the end of the delay T1, and in FIG. 1, the signal appears at the output of IF delay T1 and at the input to phase amplitude switch 9. However, after delay T2 or 0.85 nsec in the preferred embodiment of FIG. 1, the received signal appears at the output of delay T2 and is connected through the quadrant select switch to the phase amplitude switch 9. At this time, and through a suitable means not shown, but understood by those skilled in the art, the phase amplitude switch then connects the phase signal through to the steerable receivers and to the phase comparator 13. In the second embodiment, at 0.81 nsec and at the end of interval T2, and as shown in FIG. 2, the input signal injected into the IF delay T2 from the output of IF delay T1 is 500 nsec behind the input signal in delay T2 which is 310 nsec away from appearing at the output of T2. During those 500 nsec or from 810 nsec to 1310 nsec, phase comparison and phase detection takes place, as shown in FIG. 3b. After a subsequent duration of 500 nsec or at 1310 nsec, the input signal injected into the 810 nsec T2 delay from the output of IF delay T1, appears at the output of delay T2. It should be remembered, that approximately a delay period equal to T1 plus T2 is required for the signal which originally appeared at the input of delay T1 and which was injected from the output of T1 into the input of T2 to appear at the output of T2. As shown in FIG. 2, that signal at the output of T1 is reproduced in a 5 way divider which introduces signals of zero or a predetermined phase relationship at the output of the divider 17 and to each of the IF input channels. As explained above, the signal from T1 placed through the precision five way divider in step 4 then appears at the output of its respective input channel delay T2 at approximately 1310 nsec. This signal is then provided through the quadrant selected switch 9 through the phase amplitude switch to the phase comparator which then can determine the phase difference in the five If input channels produced as a result of the processing of a signal having a known or identical phase relationship through the calibrates which is, delays T2, the quadrant select switch, the phase amplitude switch, and the steerable receivers and the associated transmission lines therein.

In the second embodiment of FIG. 2 the signal is used to determine the input frequency and the steerable receiver switched accordingly, with the array selection taking place in interval II ending at 0.81 nsec or at the end of interval T2. Phase detection is allotted greater time to be completed in the embodiment of FIG. 1, as the phase calibration signal is lagging by the full delay period of T2. As shown by the time charts in FIGS. 3a and 3b, phase calibration in the embodiment of FIG. 2 lags phase detection by 500 nanoseconds as the calibration signal is injected into the IF input channels from the output of T1 (500 nsec) after it is received and when the signal being processed by the IF delay T2 has only progressed through 500 of its 810 nsec delay time. In the embodiment shown in FIG. 2, relative to FIG. 1, the period for phase detection and phase calibration is reduced as can be seen in FIGS. 3a and 3b because of the time taken by introducing the calibration signal through the 5 way precision divider 17 from the output of IF delay T1. In FIG. 1 the calibration signal is not reintroduced until it appears that the output of T2, its full delay period, after it has been received at the input of the receiver. The invention provides a reference signal obtained from the input signal and which is used in each of the IF input channels which transmitted the signal used for phase detection to measure the amount of phase distortion introduced by those channels.

The invention is described with reference to the block diagram shown in the figures and descriptions thereof, the description being completed for one skilled in the art to build the invention from known components.

The invention permits phase calibration of the receiving system with a signal replicated or split from the array developed signal used for the initial phase measurement to determine azimuth and elevation. By this invention, it is not necessary to generate separate signals for reference purpose, but through the series of delays, the same incoming signal used to measure incoming signal phase may also be used to calibrate the phase difference measuring system.

The delays may be acoustic as used in the preferred embodiment or any other suitable delay means which can store and then produce the signal after a predetermined time.

I claim:

1. A system for sequentially steering and calibrating an omnidirectional receiver providing an indication of the phase relation of received signals comprising:
   (a) antenna means having directional arrays for receiving input signals in selected directions,
   (b) quadrant processing means connected to receive the input signals from said antenna means,
   (c) said quandrant processing means including delay means for storing and providing said input signals at the output of said delay means after a predetermined time delay,
   (d) amplitude comparison means for comparing the input signals received by said antenna means during a first delay period,
   (e) switch means connected to said amplitude comparison means for connecting the quadrant processing means associated with the respective directional array developing the greatest amplitude input signal, to a phase comparator,
   (f) said delay means providing said input signals at its output, subsequent to said first delay period, and to said phase comparator,
   (g) said phase comparator providing an indication of the phase relation of said input signals.

2. The system of claim 1, wherein:
said quadrant processing means includes separate IF inputs for receiving the separate signals developed by its respective antenna means,
said separate IF inputs including said delay means and said quadrant processing means including means connecting related ones of said separate signals to said amplitude comparison means for determination of the antenna means developing the greatest amplitude signal.

3. The system of claim 2, wherein:
said delay means stores said input signal during a time period when said amplitude comparison means is comparing the said input signals.

4. The system of claim 2, wherein:
said quadrant processing means includes divider means connected to said input signal through said delay means,
said divider means replicating said input signal and inputting said input signal to said quadrant processing means,
said delay means of said quadrant processing means adding its delay to said replicated signals to the input of said phase comparation subsequent to a second delay period,
said phase comparator comparing the phase of said replicated signals to determine the phase error introduced by said quadrant processing means.

5. The system of claim 4, wherein:
said divider means is connected to said input signal through a first delay and said quadrant processing means includes a second delay, and with said second delay having its input connected to the input signal directly, and to input signal through delay providing two output signals having a delay relative to each other.

6. The system of claim 4, wherein:
said divider means is connected to the output of said delay means and said delay means is connected to said divider means and directly to the input signal.

* * * * *